United States Patent
Dinc et al.

(10) Patent No.: US 6,435,011 B1
(45) Date of Patent: Aug. 20, 2002

(54) METHOD AND APPARATUS FOR DETERMINING IF BRUSH SEALS ARE DEFECTIVE

(75) Inventors: Osman Saim Dinc, Troy, NY (US); James Louis Lawen, Jr., White, GA (US); Kenneth Roger Conway, Troy, NY (US); Onika Misasha Kerber, Greenville, SC (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 09/252,386

(22) Filed: Feb. 18, 1999

(51) Int. Cl.[7] .............................. G01M 3/32; G01M 7/02
(52) U.S. Cl. ......................................................... 73/52
(58) Field of Search ........................... 73/52, 644, 818, 73/643, 865, 865.9; 277/303, 355; 15/201; 300/21; 228/159

(56) References Cited

U.S. PATENT DOCUMENTS 3,917,150 A * 11/1975 Ferguson et al. ............ 228/159
5,758,879 A * 6/1998 Flower ........................ 277/303
5,922,968 A * 7/1999 Briscoe ......................... 73/818
6,079,714 A * 6/2000 Kemsley ...................... 277/303
6,120,622 A * 9/2000 Mayr et al. .................. 148/516

* cited by examiner

Primary Examiner—Benjamin R. Fuller
Assistant Examiner—Octavia Davis
(74) Attorney, Agent, or Firm—Enrique Abarca; Patrick K. Patnode

(57) ABSTRACT

One method empirically determines a stiffness value for each of two or more different subsets of the bristles of a brush seal, then calculates a variation in stiffness, and then identifies the brush seal as defective if the calculated variation in stiffness exceeds a predetermined stiffness variation criteria. One apparatus includes a load transducer having a contact head sized to contact less than twenty percent of the bristles, a displacement transducer which measures the displacement of the free ends of the contacted bristles, and a clamp for securing the brush seal and presenting the bristles for contact.

20 Claims, 2 Drawing Sheets

METHOD AND APPARATUS FOR DETERMINING IF BRUSH SEALS ARE DEFECTIVE

BACKGROUND OF THE INVENTION

This invention relates generally to brush seals, and more particularly to determining if a brush seal is defective.

Brush seals include linear and annular brush seals. Annular brush seals have been used, or proposed for use, between a rotor and a surrounding casing (i.e., stator casing) of a rotary machine. An annular brush seal has the shape of a completely-circular or partially-circular ring. When the annular brush seal has the shape of a partially-circular ring, several such segments are circumferentially-arrayed to form a completely-circular ring. Each annular brush seal includes a plurality of flexible, metal-wire bristles attached to (e.g., welded to) a metal bristle holder.

Rotary machines include, without limitation, turbines for steam turbines and compressors and turbines for gas turbines. Steam and gas turbines are used to produce electricity for power companies, and gas turbines are used to produce thrust for jet aircraft. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

A worn-out brush seal allows unwanted leakage to occur which reduces the efficiency of the rotary machine thereby increasing fuel costs. Some annular brush seals have become worn in service well before their expected lifetimes. What is needed is a method for determining if a brush seal is defective because it is an early-wearing brush seal, such method being most useful if it can be applied before such defective brush seal is installed in a rotary machine.

BRIEF SUMMARY OF THE INVENTION

In a first embodiment, the invention can be expressed as a method for determining if a brush seal is defective, wherein the brush seal has a set of bristles. The method includes empirically determining a stiffness value for each of two or more different subsets of the set of bristles. The method also includes calculating a variation in stiffness based on the stiffness values previously empirically determined. The method further includes identifying the brush seal as defective if the variation in stiffness previously calculated exceeds a predetermined stiffness-variation criteria.

In a second embodiment, the invention can be expressed as apparatus for determining if a brush seal is defective, wherein the brush seal has a set of bristles. The apparatus includes a load transducer, a displacement transducer, and a clamp for securing the brush seal. The load transducer has a contact head which is sized to contact less than twenty percent of the bristles of the set of bristles when the contact head and the free ends of the bristles are brought into contact. The displacement transducer is positioned to measure the displacement of the free ends of the bristles when the contact head and the free ends of the bristles are brought into contact. The clamp is positioned to present the free ends of a portion of the bristles of the set of bristles to the contact head of the load transducer.

Several benefits and advantages are derived from the invention. Applicants discovered that a brush seal having a large variation in bristle stiffness among different bristles is a defective brush seal which will have its more stiff bristles wear faster than its less stiff bristles. Such uneven wear develops quickly for a large variation in bristle stiffness and can render the brush seal unfit for proper sealing soon after installation. For an annular brush seal installed in an aircraft gas turbine application, a loss of a million dollars a year can result from using worn-out brush seals. Applicant's method and apparatus determine if a brush seal is an early-wearing brush seal before it is installed so that only long-lasting brush seals are actually installed and used.

DETAILED DESCRIPTION OF THE INVENTION

Figure 1:
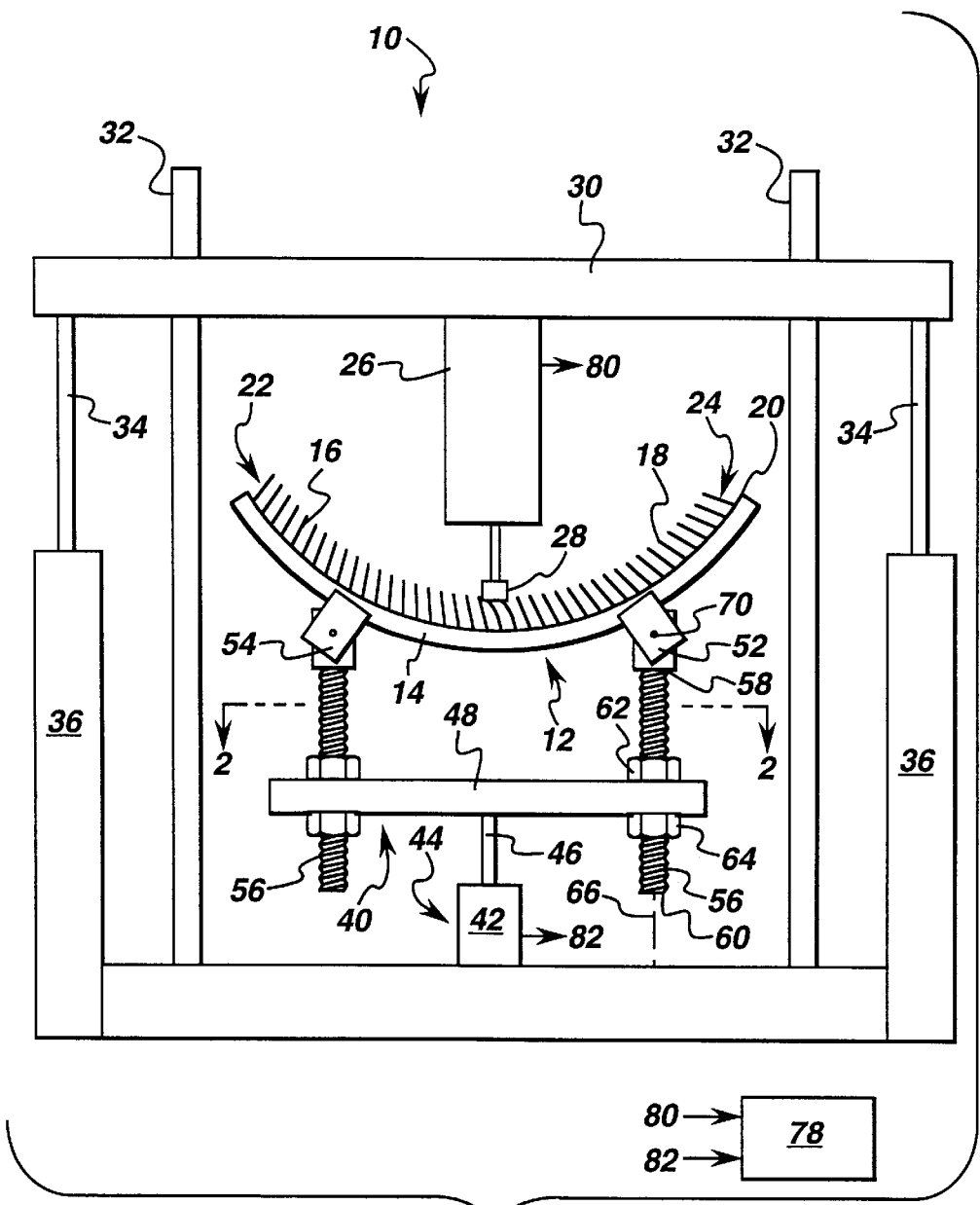
FIG. 1 is a schematic front elevational view of an embodiment of the apparatus of the invention for determining if a brush seal is defective.
Figure 2:
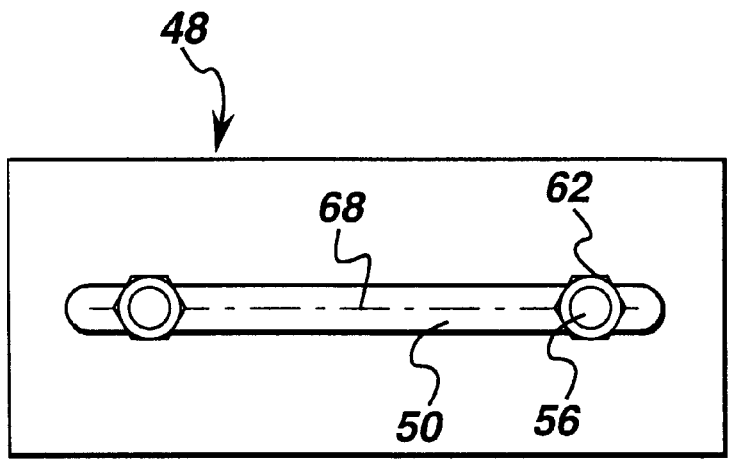
FIG. 2 is a cross-sectional view of the apparatus of FIG. 1 taken along lines 2—2 of FIG. 1.

Referring now to the drawings, FIGS. 1 and 2 show an embodiment of the apparatus 10 of the invention for determining if a brush seal 12 (whether new or used) is defective. If the apparatus 10 does not determine that the brush seal 12 is defective, the brush seal 12 is suitable for initial or continued use. If the apparatus 10 determines that the brush seal 12 is defective, the brush seal 12 is sent to the scrap pile or the recycle bin. As will be appreciated by the artisan, the apparatus 10 measures the stiffness of the brush seal 12. The brush seal 12 shown in FIG. 1 is an annular brush seal which has the shape of a partially-circular ring. Typically, several such segments are circumferentially-arrayed to form a completely-circular ring. It is understood by the artisan that the apparatus 10 can accept or be modified to accept a brush seal which has an arbitrary shape including, without limitation, a completely-circular ring shape, a partially or completely-elliptical ring shape, or a rectilinear shape. It is noted that the apparatus 10 can be modified to test installed brush seals to determine if they are defective. Brush seals are used in many applications including, without limitation, gas and steam turbines for power generation and gas turbines for aircraft propulsion.

The brush seal 12 has a support plate 14 and a set of bristles 16. The set of bristles 16 is defined to be all of the bristles 16 of the brush seal 12. The bristles 16 each have a free end 18 and an attached end 20. The attached end 20 is secured to the support plate 14. The support plate may be shaped to include a backing plate portion and/or an upstream plate portion as is known to the artisan. Such backing and upstream plate portions, which have been omitted from the figures for clarity, may be separate plates attached to the support plate 14. The annular brush seal 12 of FIG. 1 has an arc length extending from the left-most bristles 22 to the right-most bristles 24. It is noted that the bristles 16 have a bristle length extending from the attached end 20 to the free end 18, and that the brush seal 12 has a thickness which extends into the page of FIG. 1. Typically, the bristles 16 are metal wire bristles whose attached ends 20 are welded to the support plate 14. It is noted that the invention is not limited to metal and/or wire bristles.

Apparatus 10 includes a load transducer 26 which includes a contact head 28 which is sized to contact less than twenty percent of the bristles 16 of the set of bristles 16 when the contact head 28 and the free ends 18 of the bristles 16 are brought into contact. The load transducer 26 measures the force exerted by the contacted bristles 16 on the contact head 28. In FIG. 1, the load transducer 26 is shown attached to a movable bar 30 whose height on the support rods 32 can be adjusted by the pistons 34 of the powered cylinders 36. In one exemplary embodiment, the contact head 28 is sized to contact less than ten percent of the bristles 16 of the set of bristles 16 when the contact head 28 and the free ends 18 of the bristles 16 are brought into contact, and in another exemplary embodiment, the contact head 28 is sized to contact less than five percent of the bristles 16 of the set of bristles 16 when the contact head 28 and the free ends 18 of the bristles 16 are brought into contact. In one example, the contact head 28 is sized to contact generally two and one-half percent of the bristles 16 of the set of bristles 16 when the contact head 28 and the free ends 18 of the bristles 16 are brought into contact. When the brush seal is an annular brush seal 12 having the previously-described arc length, in one embodiment the contact head 28 is sized to contact the bristles 16 along less than twenty, ten, or five percent of the arc length when the contact head 28 and the free ends 18 of the bristles 16 are brought into contact A smaller size of the contact head 28 means a greater number of independent bristle locations that can be measured. In an exemplary embodiment, for an annular brush seal 12, the contact head 28 has a radius which matches the radius of the free ends 18 of the set of bristles 16.

Apparatus 10 also includes a clamp 40 for securing the brush seal 12. The clamp 40 is disposed to present the free ends 18 of a portion of the bristles 16 of the set of bristles 16 to the contact head 28 of the load transducer 26. In a first embodiment, apparatus 10 also includes a displacement transducer 42 which is disposed to measure the displacement of the free ends 18 of the bristles 16 when the contact head 28 and the free ends 18 of the bristles 16 are brought into contact. In a second embodiment, apparatus 10 also includes a linear positioner 44 having a piston 46. Here, the piston 46 is attached to the clamp 40 and moves the clamp 40 such that the free ends 18 of the previously-described portion of the bristles 16 of the secured brush seal 12 are brought into contact with the contact head 28 of the load transducer 26. Here, the linear positioner 44 includes the previously-described displacement transducer 42 which measures the displacement of the free ends 18 of the bristles 16 when the contact head 28 and the free ends 18 of the bristles 16 are brought into contact. As can be appreciated by the artisan, apparatus 10 can be modified to test installed brush seals once other components (such as rotors) have been removed to provide proper access to the bristles. It is noted that the displacement transducer 42 also can be used to measure bristle wear of contacted bristles at various bristle locations by measuring the distance to initial bristle contact from a reference point.

In an exemplary embodiment, the clamp 40 includes a base plate 48 with a slot 50 (shown in FIG. 2) and also includes two spaced-apart first and second seal holders 52 and 54 for contacting and supporting the brush seal 12. The first and second seal holders 52 and 54 are movable in the slot 50 and are securable to the base plate 48. The clamp 40 also includes a threaded bolt 56 having a first end 58 and a second end 60. The threaded bolt 56 is rotatable to different heights above the base plate 48 and is secured to the base plate 48. The threaded bolt 56 is secured to the first seal holder 52 proximate the first end 58. It is noted that a threaded bolt 56 is provided for each seal holder 52 and 54. The clamp 40 additionally includes a first nut 62 threaded onto the threaded bolt 56 above and in contact with the base plate 48 and includes a second nut 64 threaded onto the threaded bolt 56 below and in contact with the base plate 40. The threaded bolt 56 has a longitudinal axis 66, the slot 50 has a lengthwise axis 68, and the first seal holder 52 is rotatable about an axis 70 which is perpendicular to both the longitudinal axis 66 of the threaded bolt 56 and the lengthwise axis 68 of the slot 50 of the base plate 48. As can be appreciated by those skilled in the art, the clamp 40 allows the first and second seal holders 52 and 54 independently to be set at an arbitrary distance along the longitudinal axis 66 and an arbitrary distance along the lengthwise axis 68 and independently to be set at an arbitrary angular orientation about the axis 70 (which typically is a bolt) thus allowing the bristles 16 of any area of the brush seal 12 to be presented to the contact head 28 of the load transducer 26.

Figure 3:
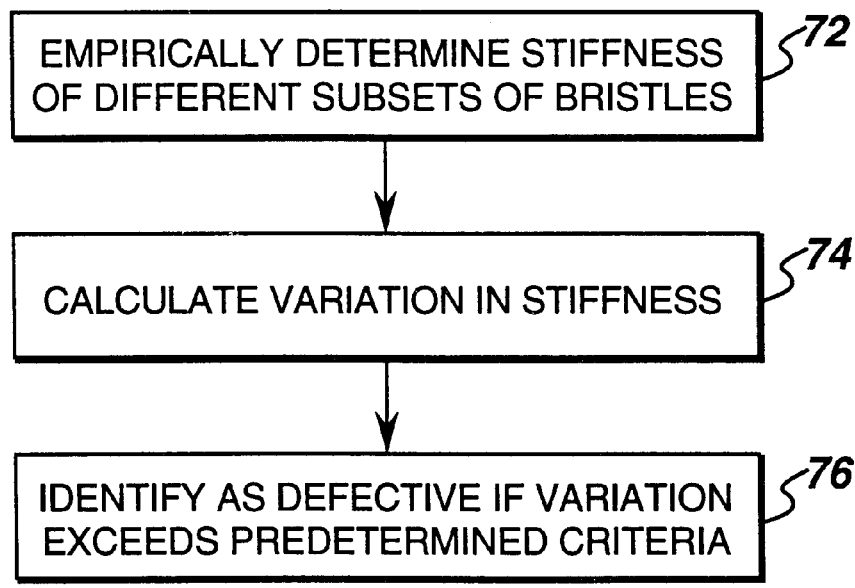
FIG. 3 is a flow chart of an embodiment of the method of the invention for determining if a brush seal is defective.

Referring again to the drawings, FIG. 3 shows an embodiment of the method of the invention for determining if a brush seal 12 is defective, wherein the brush seal has a set of bristles 16. In this embodiment, the method includes steps a), b), and c). Step a) is shown in block 72 of FIG. 3 as "Empirically Determine Stiffness Of Different Subsets Of Bristles". Step a) includes empirically determining a stiffness value for each of a plurality of different subsets of the set of bristles 16. An empirically-determined stiffness value will depend on a measured force exerted on the bristles and a measured deflection of the bristles caused by that force. One definition is that the stiffness value equals the measured force (or pressure, i.e., the force per unit area of the contact head 28) for a prechosen measured deflection divided by the diameter of a bristle. Another definition is that the stiffness value equals the measured force (or pressure, i.e., the force per unit area of the contact head 28) for a prechosen measured deflection divided by the cross-sectional area of the involved bristles. Other definitions utilizing force and deflection may be chosen by the artisan.

In an exemplary embodiment, a bristle 16 of one subset belongs only to that subset, and, for an annular brush seal 12, different subsets are disposed at different locations along the arc length of the brush seal. In other words, and in an one example employing an annular brush seal 12, step a) includes empirically determining a stiffness value for each of at least five completely different subsets of the set of bristles 16 along the arc length of the annular brush seal 12. As can be appreciated by the artisan, a more detailed map of stiffness variation can be obtained wherein step a) includes empirically determining a stiffness value for each of at least ten completely different subsets of the set of bristles 16 along the arc length of the brush seal 12.

Step b) is shown in block 74 of FIG. 3 as "Calculate Variation In Stiffness". Step b) includes calculating a variation in stiffness based on the stiffness values empirically determined in step a). One definition is that the variation in stiffness is calculated for each subset and is equal to the absolute value of the difference between the stiffness value of the subset and the average of the stiffness values of all the empirically-determined subsets. In one example, the average is defined to be the mean value. Other definitions of variation and/or average may be chosen by the artisan.

Step c) is shown in block 76 of FIG. 3 as "Identify As Defective If Variation Exceeds Predetermined Criteria". Step c) includes identifying the brush seal 12 as defective if the variation in stiffness calculated in step b) exceeds a predetermined stiffness-variation criteria. One example of a predetermined stiffness-variation criteria is that a brush seal 12 is identified as being defective if the absolute value of the variation in stiffness calculated in step b) for any subset exceeds twenty-five percent of the average (e.g., the mean) of the stiffness values empirically determined in step a). Another example of a more demanding predetermined stiffness-variation criteria is that a brush seal 12 is identified as being defective if the absolute value of the variation in stiffness calculated in step b) for any subset exceeds ten percent of the average of the stiffness values empirically determined in step a). Other criteria may identify a brush seal 12 as defective if at least two (or some other number) or at least ten percent (or some other percent) of the subsets have stiffness-variations exceeding, say, some percentage of the average bristle stiffness of the empirically-determined subsets. Applicants measured stiffness variations of generally three hundred percent in early-worn seals and recognized that such a large stiffness variation was the cause of the brush-seal early-wear problem. For such measurements, Applicants used an MTS Model 810 Material Test System which integrated the load transducer 26, displacement transducer 42, and linear positioner 44 in a single machine.

From the above description, it is seen that in one embodiment the apparatus of the invention may also be described as including means for empirically determining a stiffness value for each of a plurality of different subsets of the set of bristles 16, means for calculating a variation in stiffness based on the stiffness values empirically determined by the empirically-determining means, and means for identifying the brush seal 12 as defective if the variation in stiffness calculated by the calculating means exceeds a predetermined stiffness-variation criteria. In one example, the empirically-determining means is the previously-described apparatus 10 of FIGS. 1 and 2 with the addition of a computer 78 which determines (or a technician who mathematically determines) a stiffness value from the output 80 of the load transducer 26 and the output 82 of the displacement transducer 42. In another example, (not shown), the empirically-determining means includes portable apparatus to empirically determine bristle stiffness of an installed brush seal, such portable apparatus being attachable to suitable structure on or proximate the installed brush seal. In an exemplary embodiment, a bristle of one subset belongs only to that subset, and, for an annular brush seal 12, different subsets are disposed at different locations along the arc length of the annular brush seal 12. For an annular brush seal, in one example the empirically-determining means determines a stiffness value for each of at least five completely different subsets of the set of bristles 16 along the arc length of the brush seal 12. A more detailed map of stiffness variation is obtained, in another example, wherein the empirically-determining means determines a stiffness value for each of at least ten completely different subsets of the set of bristles 16 along the arc length of the annular brush seal 12.

In one example, the calculating means includes a computer, such as the previously-described computer 78, which calculates the variation in stiffness for each subset from the output 80 of the load transducer 26 and the output 82 of the displacement transducer 42. In another example, the calculating means includes a technician who mathematically determines stiffness from the load transducer 26 and the displacement transducer 42.

Likewise, in one example the identifying means includes a computer, such as the previously-described computer 78, which stores the predetermined stiffness variation criteria and which compares the calculated variation in stiffness with the stored criteria. In another example, the identifying means includes a technician who mathematically (or visually on a graph) compares the calculated variation in stiffness with the predetermined stiffness variation criteria. For an annular brush seal, in an exemplary embodiment the identifying means identifies the annular brush seal 12 as defective if the absolute value of the variation in stiffness calculated by the calculating means for any subset exceeds twenty-five percent (or exceeds ten percent in more demanding applications) of the average of the stiffness values empirically determined by the empirically-determining means.

As previously mentioned, several benefits and advantages are derived from the invention. Applicants' discovered that a brush seal having a large variation in bristle stiffness among different bristles is a defective brush seal which will have its more stiff bristles wear faster than its less stiff bristles. Such uneven wear develops quickly for a large variation in bristle stiffness and can render the brush seal unfit for proper sealing soon after installation. For an annular brush seal installed in an aircraft gas turbine application, a loss of a million dollars a year can result from using worn-out brush seals. Applicant's method and apparatus determines if a brush seal is an early-wearing brush seal before it is installed so that only long-lasting brush seals are actually installed and used.

The foregoing description of several embodiments of the method and apparatus of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A method for determining if a brush seal is defective, wherein said brush seal has a set of bristles, and wherein the method comprises the steps of:

a) empirically determining a stiffness value using a load transducer and a pressure transducer for each of a first plurality of subsets of said set of bristles;

b) calculating a variation in stiffness for each of said first plurality of subsets of said set of bristles based on the stiffness values empirically determined in step a), said variation corresponding to a difference in stiffness values between a respective subset and an average of empirically determined stiffness values for a second plurality of subsets; and c) identifying said brush seal as defective if said variation in stiffness calculated in step b) exceeds a predetermined stiffness-variation criteria.

2. The method of claim 1, wherein a bristle of one subset belongs only to that subset.

3. The method of claim 2, wherein said brush seal has a shape of an annular brush seal having an arc length, and wherein different subsets are disposed at different locations along said arc length.

4. A method for determining if an annular brush seal is defective, wherein said annular brush seal has an arc length and has a set of bristles, and wherein the method comprises the steps of:

a) empirically determining a stiffness value using a load transducer and a pressure transducer for each of at least five subsets of said set of bristles along said arc length;

b) calculating a variation in stiffness for each of said at least five subsets based on the stiffness values empirically determined in step a); and c) identifying said annular brush seal as defective if an absolute value of said variation in stiffness calculated in step b) for any subset exceeds twenty-five percent of an average of said stiffness values for a plurality of said subsets empirically determined in step a).

5. The method of claim 4, wherein step a) includes empirically determining a stiffness value for each of at least ten completely different subsets of said set of bristles along said arc length.

6. The method of claim 5, wherein step c) includes identifying said annular brush seal as defective if the absolute value of said variation in stiffness calculated in step b) for any subset exceeds ten percent of an average of said stiffness values empirically determined in step a).

7. Apparatus for determining if a brush seal is defective wherein said brush seal has a set of bristles, and wherein the apparatus comprises:

a) means for empirically determining a stiffness value for each of a first plurality of subsets of said set of bristles, said set of bristles being installed in a rotary machine;

b) means for calculating a variation in stiffness for each of said first plurality of subsets of said set of bristles based on the stiffness values empirically determined by the empirically-determining means, said variation corresponding to a difference in stiffness values between a respective subset and an average of empirically determined stiffness values for a second plurality of subsets and;

c) means for identifying said brush seal as defective if said variation in stiffness by the calculating means exceeds a predetermined stiffness-variation criteria.

8. The apparatus of claim 7, wherein a bristle of one subset belongs only to that subset.

9. The apparatus of claim 8, wherein said brush seal has a shape of an annular brush seal having an arc length, and wherein different subsets are disposed at different locations along said arc length.

10. Apparatus for determining if an annular brush seal is defective, wherein said annular brush seal has an arc length and has a set of bristles, and wherein the apparatus comprises:

a) means for empirically determining a stiffness value for each of at least five subsets of said set of bristles along said arc length bristles, said set of bristles being installed in a rotary machine;

b) means for calculating a variation in stiffness for each of said at least five subset based on the stiffness values empirically determined by the empirically-determining means; and c) means for identifying said annular brush seal as defective if an absolute value of said variation in stiffness calculated by the calculating means for any subset exceeds twenty-five percent of an average of said stiffness values for a plurality of said subsets empirically determined by the empirically-determining means.

11. The apparatus of claim 10, wherein the empirically-determining means includes empirically determining a stiffness value for each of at least ten completely different subsets of said set of bristles along said arc length.

12. The apparatus of claim 11, wherein the identifying means includes means for identifying said annular brush seal as defective if an absolute value of said variation in stiffness calculated by the variation means for any subset exceeds ten percent of an average of said stiffness values empirically determined by the empirically-determining means.

13. Apparatus for measuring a stiffness of a brush seal, wherein said brush seal has a set of bristles, wherein said bristles each have a free end, and wherein the apparatus comprises:

a) a load transducer having a contact head which is sized to contact less than twenty percent of said bristles of said set of bristles when said contact head and said free ends of said bristles are brought into contact;

b) a displacement transducer which is disposed to measure the displacement of said free ends of said bristles when said contact head and said free ends of said bristles are brought into contact; and c) a clamp for securing said brush seal and disposed to present a said free ends of a portion of said bristles of said set of bristles to said contact head of said load transducer.

14. The apparatus of claim 13, wherein said contact head is sized to contact less than ten percent of said bristles of said set of bristles when said contact head and said free ends of said bristles are brought into contact.

15. The apparatus of claim 14, wherein said contact head is sized to contact less than five percent of said bristles of said set of bristles when said contact head and said free ends of said bristles are brought into contact.

16. Apparatus for measuring a stiffness of an annular brush seal, wherein said annular brush seal has an arc length and has a set of bristles, wherein said bristles each have a free end, and wherein the apparatus comprises:

a) a load transducer having a contact head which is sized to contact said bristles along less than five percent of said arc length when said contact head and said free ends of said bristles are brought into contact;

b) a clamp for securing said annular brush seal and disposed to present said free ends of a portion of said bristles of said set of bristles to said contact head of said load transducer; and c) a linear positioner having a piston, wherein said piston is attached to said clamp and moves said clamp such that said free ends of said portion of said bristles of said secured annular brush seal are brought into contact with said contact head of said load transducer, and wherein said linear positioner includes a displacement transducer which measures the displacement of said free ends of said bristles when said contact head and said free ends of said bristles are brought into contact.

17. The apparatus of claim 16, wherein said clamp includes a base plate with a slot and also includes two spaced-apart first and second seal holders for contacting and supporting said annular brush seal, wherein said first and second seal holders are movable in said slot and are securable to said base plate.

18. The apparatus of claim 17, wherein said clamp includes a threaded bolt, wherein said threaded bolt has a first end and a second end, wherein said threaded bolt is rotatable to different heights above said base plate and is secured to said base plate and wherein said threaded bolt is secured to said first seal holder proximate said first end.

19. The apparatus of claim 18, wherein said clamp includes a first nut threaded onto said threaded bolt above and in contact with said base plate and also includes a second nut threaded onto said threaded bolt below and in contact with said base plate.

20. The brush seal of claim 19, wherein said threaded bolt has a longitudinal axis, wherein said slot has a lengthwise axis, and wherein said first seal holder is rotatable about an axis which is perpendicular to both said longitudinal axis of said threaded bolt and said lengthwise axis of said slot of said base plate.

* * * * *